Sept. 22, 1953     H. S. FOX     2,652,915
ALIGNING DEVICE

Filed Sept. 21, 1950     2 Sheets-Sheet 1

INVENTOR.
Harry S. Fox
BY
ATTORNEY

Sept. 22, 1953
H. S. FOX
2,652,915
ALIGNING DEVICE
Filed Sept. 21, 1950
2 Sheets-Sheet 2
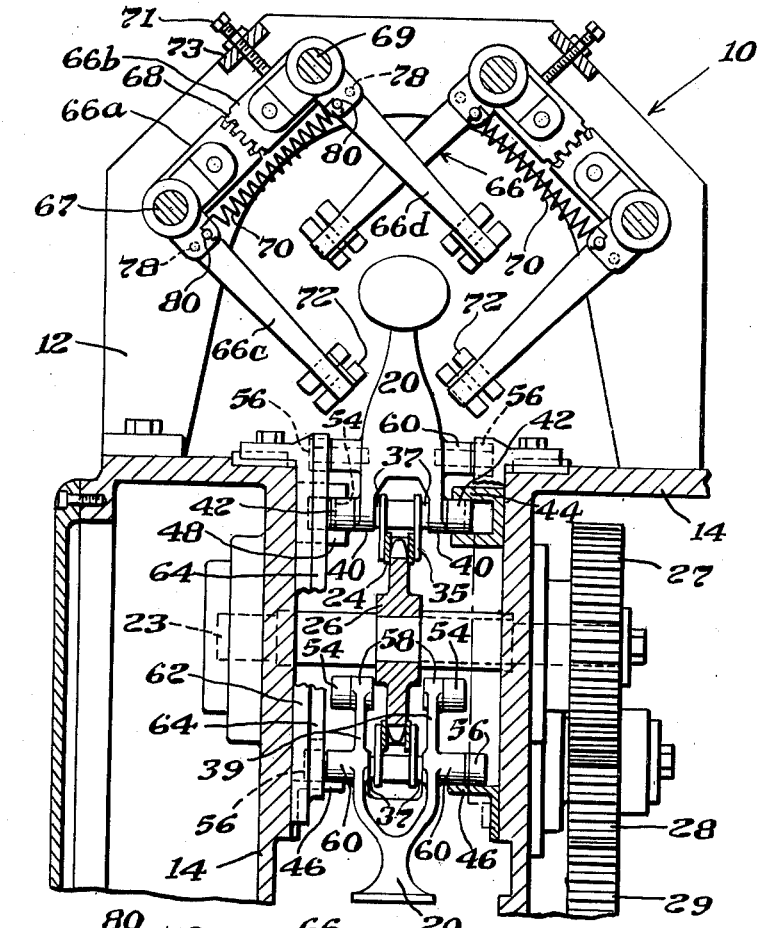
Fig. 2
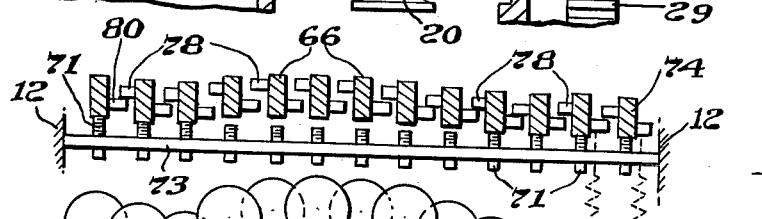
Fig. 3
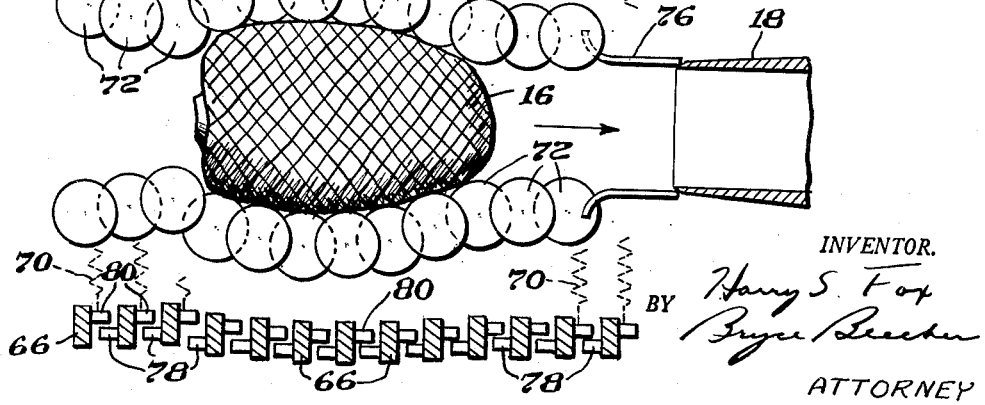
INVENTOR.
Harry S. Fox
BY Bryce Beecher
ATTORNEY Patented Sept. 22, 1953

2,652,915

UNITED STATES PATENT OFFICE 2,652,915

ALIGNING DEVICE

Harry S. Fox, Waimanalo, Oahu, Honolulu, Territory of Hawaii, assignor to Hawaiian Pineapple Company, Limited, Honolulu, Territory of Hawaii, a corporation of Hawaii Application September 21, 1950, Serial No. 186,034

10 Claims. (Cl. 193—35)

My invention relates to an aligning device or attachment and in its most particular application concerns a centering head for the rotary sizing knife of a Ginaca machine.

The Ginaca machine is employed in preparing pineapples for canning. A description thereof is provided, for example, by U. S. Patent No. 2,195,193 taken in conjunction with the patents therein cited. Suffice it to say here that the machine performs the following operations in the order indicated:

(a) Sizes the pineapple, i. e., removes all but the crown and butt portions of the rind or shell.

(b) Cuts off the crown.

(c) Cuts off the butt, including so much of the stem as may be present.

(d) De-cores the sized, de-crowned and de-butted fruit.

In the aligning or centering of the pineapple with relation to the rotary sizing knife used in step (a) it is essential that the means employed be capable of yielding uniformly to the shape of the fruit, which is a variable. While the attachment proposed by Ginaca (U. S. Patent No. 1,060,248) has, on the whole, worked well in practice, considerable loss has been experienced in the case of soft fruit due to bruising.

My invention has as its principal object to provide a centering attachment which overcomes this fault. Other objects and advantages will be apparent from the following description which will proceed with reference to the accompanying drawings illustrating the invention in its preferred embodiment. In the drawings, Fig. 1 is a view partly in section and partly in elevation showing the centering attachment as associated with a rotary tubular sizing knife such as referred to hereinabove;

Fig. 2 is a section on the lines indicated in Fig. 1; and

Fig. 3 is a diagrammatic representation of the centering attachment.

Figure 1:
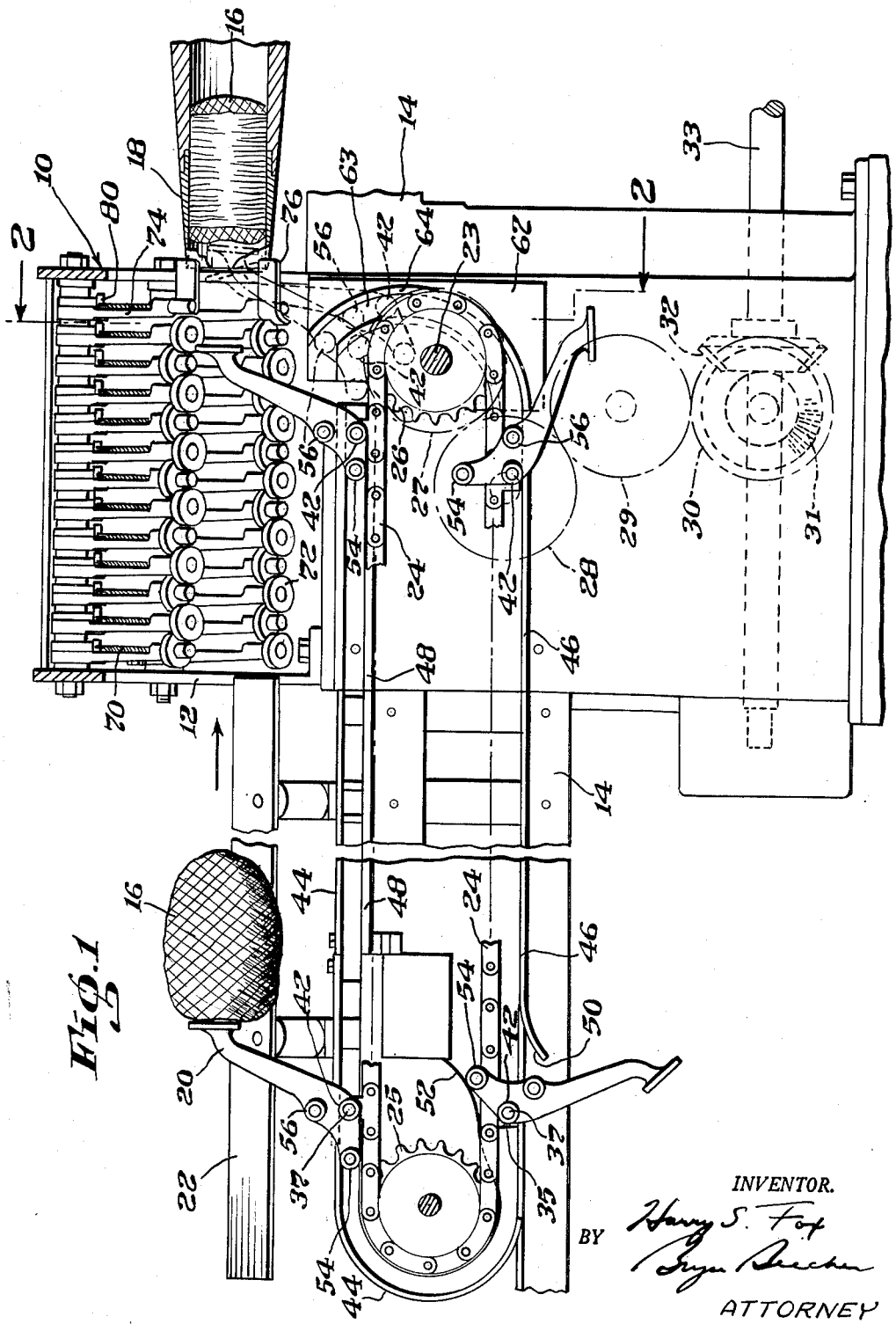

The attachment, which is generally denoted by the numeral 10, includes a frame 12, bolted or otherwise suitably secured to the main frame 14 of the Ginaca machine. Pineapples 16 to be sized by the rotary tubular knife 18, are pushed through the attachment by dogs 20, the pineapples being supported forward of the attachment by chute 22, which is centrally slotted to accommodate the dogs. The pineapples may be fed to the chute either automatically or by hand.

The dogs 20 are carried by an endless chain 24 which passes around sprocket wheels 25 and 26. Sprocket wheel 26 is fixed on a shaft 23 which is driven through a train of gears including spur gears 27, 28, 29 and 30 and bevel gears 31 and 32, the latter being fixed to a drive shaft 33.

The dogs are attached to the chain through lugs 35 which carry pins 37 about which the dogs pivot. The pins pass through the legs of the dogs at the knees 40. At the ends of the pins are mounted rollers 42 which ride in a guideway including outer guide rails 44 and 46 and inner guide rails 48. Guide rails 46 at their left-hand ends (Fig. 1) terminate in downwardly sloping portions 50, while the curved sections of guide rails 48 and in cam members 52.

In addition to rollers 42, dogs 20 have associated therewith rollers 54 and 56. These rollers are fixed to pins journaled in bosses 58 and 60, respectively, integral with the body of the dogs. Rollers 42 are positioned inwardly of rollers 56 and slightly outwardly of rollers 54 (Fig. 2).

Guide rails 44 and 48 terminate at their right-hand ends (Fig. 1) at points just short of plates 62 positioned one at either side of the driven sprocket wheel 26. These plates are cast or otherwise formed to provide cam tracks 63 around the inner faces of the plates for the rollers 56 which enter the cam tracks just as the rollers 54 lose engagement with the guide rails 44 and 48. A principal advantage of this arrangement, which represents the invention of Gustav Guigas and which is claimed by him in his application Serial No. 186,019, filed September 21, 1950, resides in the controlled entrance and retraction of the dogs with relation to the throat of the tubular knife 18.

Following retraction of the dog from the throat of the sizing knife, the dog falls forward on its pivot 37 to the extent permitted by the cam tracks and the guide rails 46, which, in effect, represent continuations of the outer races 64 of the cam tracks. The rails 46, as shown in Fig. 2, are sufficiently wide to accommodate rollers 42 as well as rollers 56, but this is obviously not critical since they need to be only wide enough to accommodate the latter rollers.

After the rollers 56 lose contact with the downwardly sloping portions 50 of the rails 46, the dog swings freely momentarily before it is swung clockwise by the camming action of the members 52 which are engaged by the rollers 54. The dog is in working position once it has rounded the sprocket 25.

Returning now to the centering head 10, it will be noted that the same is in axial alignment with relation both to the dogs 20 and the sizing knife 18. The centering head comprises two sets of roller-bearing members 66, the sets being interlaced (Fig. 2) and being disposed at right angles to each other. Each unit 66 includes two parts 66a and 66b, pivoted on stationary shafts 67 and 69, respectively, and interconnected through gear teeth 68 and a spring 70, the ends of which are anchored to pins 80. A set screw 71, threaded through a bar 73 extending between the frame members 12 and bearing on one of the parts 66a, 66b allows adjustment of the spread between the arms 66c and 66d, as determined by the size of the fruit being processed.

Although arms 66c and 66d, as shown, are of the same length, one of the arms mounts its roller inwardly of the end of the arm so as to provide for overlapping of the rollers in each roller series (Fig. 1).

The centering attachment, in addition to the roller-bearing members 66, comprises two members 74 at the end of the attachment adjacent the tubular knife 18. Such members of which only one appears in the drawings (Fig. 1), are disposed as members 66, each set of the members 66 terminating in one of the members 74. The latter differ from the members 66 only in that they carry fingers 76 in lieu of rollers. The fingers extend to a point just beyond the cutting edge of the rotary knife 18 and serve to guide the pineapple directly into the throat of the knife.

A most important feature of the invention goes to the provision of means whereby the spreading movement of each member 66 (except the first in line of said members) and each member 74 is initiated before the pineapple has actually contacted the roller or finger carried by the member. In the embodiment of the invention to which the drawings are directed this is accomplished through pins 78 (see Fig. 2) and 80 which are mounted on successive arms 66c, 66d equally spaced from common shafts 67, 69 so that upon spreading of arms 66c, 66d, pins 80 will engage pins 78 on the next successive arms in the series.

The operation of the centering attachment will be readily understood, if not already clear, through reference to the diagrammatic representation of Fig. 3. From this figure, it will be seen that on engagement of the pineapple with the first in series of the rollers 72, the arms of the corresponding member 66, the initial setting of which is determined by adjustment of the screw 71, are spread apart against the restraining force of the spring 70, this movement being accompanied by contact of the pins 80 carried by the arms with the pins 78 on the arms of the member 66 next in line, the latter arms being thus already in the act of spreading when the rollers thereon are contacted by the pineapple. Such action obtaining throughout the length of the attachment, bruising of the fruit is held to a minimum and substantial savings are realized.

It should not be taken from the foregoing that my invention is limited to the particular use indicated, as it has potential application in a number of other fields. The attachment as shown may obviously be variously changed and modified without departing from the spirit and scope of the invention:

I claim:

1. In an aligning attachment of the type presenting a passageway through which the object to be aligned is caused to travel, a plurality of successive oppositely disposed pairs of roller guide members arranged along said passageway, means for yieldingly urging the members of each said pair toward each other to engage said object, means for limiting the movement of said paired members toward each other, and means associated with each said pair engageable with a successive pair upon spreading of the first said pair a predetermined distance to spread the successive pair as the object advances toward the successive pair.

2. The device of claim 1 in which each successive pair is spreadable independently of the preceding pairs.

3. In an aligning attachment of the type presenting a passageway through which the object to be aligned is caused to travel, a plurality of successive oppositely disposed pairs of guide members arranged along said passageway, means for yieldingly urging the members of each said pair toward each other to engage said object, means for limiting the movement of said paired members toward each other, and lugs associated with each said pair engageable with a successive pair upon spreading of the first said pair a predetermined distance to spread the successive pair as the object advances toward the successive pair, each successive pair being spreadable independently of the preceding pairs.

4. In an aligning attachment of the type presenting a passageway through which the object to be aligned is caused to travel, a plurality of successive oppositely disposed pairs of guide members arranged along said passageway, means for yieldingly urging the members of each said pair toward each other to engage said object, means for limiting the movement of said paired members toward each other, and lugs associated with each said pair engageable with a preceding pair upon spreading of the preceding pair a predetermined distance to spread the successive pair as the object advances toward the successive pair, each successive pair being spreadable independently of the preceding pairs.

5. In an aligning attachment of the type presenting a passageway through which the object to be aligned is caused to travel, a plurality of series of oppositely disposed pairs of roller guide members arranged in spaced rows parallel to the axis of said passageway, means for yieldingly urging each said pair toward each other to engage said object as it travels through said passageway, means connecting opposite members of each pair to produce, upon movement of one member, a corresponding opposite movement of the other, means for limiting the movement of the members of each said pair toward each other, and means associated with each pair in a series engageable with a successive pair in the series upon spreading of the first pair a predetermined distance to spread said successive pair as the object advances toward the successive pair.

6. In an aligning attachment of the type presenting a passageway through which the object to be aligned is caused to travel, a series of oppositely disposed pairs of yieldingly spreadable spaced guide members arranged in rows parallel to the axis of said passageway, lever means connecting opposite members of each pair to cause corresponding opposite movement of each member upon movement of the other member of the pair, and members for spreading each successive pair in the series actuable upon spreading of a preceding pair in the series by a predetermined distance, each said successive pair being spreadable independently of the preceding pairs.

7. In an aligning attachment of the type presenting a passageway through which the object to be aligned is caused to travel, a plurality of series of oppositely disposed pairs of yieldingly spreadable spaced roller guide members arranged in spaced rows parallel to the axis of said passageway, lever means connecting opposite members of each pair to produce equal and opposite movement of each member upon movement of the other member, and means associated with each successive pair in a series actuable by a preceding pair upon spreading thereof a predetermined distance to spread said successive pair, each successive pair being spreadable independently of the preceding pairs.

8. The apparatus of claim 7 in which there are two series of paired guide members arranged in rows spaced approximately 90° apart.

9. An aligning attachment having a passageway through which travel the objects to be aligned, said attachment comprising a frame, two series of oppositely disposed paired roller guide members arranged in rows along said passageway approximately 90° apart, the opposite members of each pair being coupled together for equal and opposite movement toward and away from each other, means for yieldingly resisting movement of said paired members from each other, means for limiting movement of said paired members toward each other, and lost-motion means for moving the members of each successive pair in a series away from each other actuated by movement of a preceding pair in the series away from each other, each successive pair being movable away from each other independently of the preceding pairs.

10. In an aligning attachment of the type presenting a passageway through which the object to be aligned is caused to travel, a series of oppositely disposed pairs of yieldingly spreadable spaced guide members arranged in rows parallel to the axis of said passageway, means connecting opposite members of each pair to cause corresponding opposite movement of each member upon movement of the other member of the pair, and means for spreading each successive pair in the series in response to the spreading of a preceding pair, each successive pair being spreadable independently of the preceding pairs.

HARRY S. FOX.

References Cited in the file of this patent

UNITED STATES PATENTS

| Number | Name | Date |
|---|---|---|
| 79,962 | Day | July 14, 1868 |
| 304,149 | Warfield | Aug. 26, 1884 |
| 710,848 | Davidson | Oct. 7, 1902 |
| 1,060,247 | Ginaca | Apr. 29, 1913 |
| 1,060,248 | Ginaca | Apr. 29, 1913 |
| 1,430,124 | Stanley | Sept. 26, 1922 |
| 2,220,380 | Skolrud | Nov. 5, 1940 |